United States Patent
Hayashi et al.

(10) Patent No.: US 12,307,686 B2
(45) Date of Patent: May 20, 2025

(54) VISION SENSOR IMAGE PROCESSING DEVICE, IMAGE PROCESSING METHOD, AND PROGRAM

(71) Applicant: Sony Interactive Entertainment Inc., Tokyo (JP)

(72) Inventors: Masakazu Hayashi, Tokyo (JP); Hiromasa Naganuma, Tokyo (JP); Yosuke Kurihara, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 335 days.

(21) Appl. No.: 17/636,186

(22) PCT Filed: Aug. 20, 2019

(86) PCT No.: PCT/JP2019/032343
§ 371 (c)(1),
(2) Date: Feb. 17, 2022

(87) PCT Pub. No.: WO2021/033251
PCT Pub. Date: Feb. 25, 2021

(65) Prior Publication Data
US 2022/0292693 A1    Sep. 15, 2022

(51) Int. Cl.
*G06T 7/246*    (2017.01)

(52) U.S. Cl.
CPC .... *G06T 7/246* (2017.01); *G06T 2207/10016* (2013.01); *G06T 2207/20004* (2013.01)

(58) Field of Classification Search
CPC .......... G06T 2207/10016; G06T 7/246; G06T 7/20–292; G06T 2207/20004–20012; G06V 20/44; H04N 25/47
See application file for complete search history.

(56) References Cited

U.S. PATENT DOCUMENTS 9,389,693 B2    7/2016 Lee
10,237,506 B2    3/2019 Park
(Continued)

FOREIGN PATENT DOCUMENTS

CN    108229333 A    6/2018
CN    109544590 A  *  3/2019  ............. G06F 18/22
(Continued)

OTHER PUBLICATIONS

B. Kueng, E. Mueggler, G. Gallego and D. Scaramuzza, "Low-latency visual odometry using event-based feature tracks," 2016 IEEE/RSJ International Conference on Intelligent Robots and Systems (IROS), Daejeon, Korea (South), 2016, pp. 16-23, doi: 10.1109/IROS.2016.7758089. (Year: 2016).*
(Continued)

*Primary Examiner* — Utpal D Shah
*Assistant Examiner* — Jack Peter Kraynak
(74) *Attorney, Agent, or Firm* — Kilpatrick Townsend & Stockton LLP

(57) ABSTRACT

An image processing device includes a region identifying section that identifies a first region in which a first motion occurs in a subject in an image captured by synchronous scanning, and a second region in which a second motion different from the first motion occurs in the subject or in which the subject is not substantially moving, on the basis of an event signal generated in response to a change in intensity of light in one or a plurality of pixels of the image, and an image processing section that executes image processing different between the first region and the second region on the first region and the second region, in the image.

20 Claims, 6 Drawing Sheets

(56) References Cited

U.S. PATENT DOCUMENTS

| | | | |
|---|---|---|---|
| 10,600,189 B1* | 3/2020 | Bedikian | G06T 7/73 |
| 10,740,653 B2 | 8/2020 | Shiraishi | |
| 10,812,711 B2* | 10/2020 | Sapienza | H04N 25/76 |
| 10,824,872 B2 | 11/2020 | Edpalm | |
| 11,122,224 B2 | 9/2021 | Suh | |
| 2004/0028287 A1 | 2/2004 | Kondo | |
| 2011/0091074 A1 | 4/2011 | Nobori | |
| 2012/0257789 A1* | 10/2012 | Lee | G06F 3/017 382/103 |
| 2014/0002616 A1* | 1/2014 | Ohba | G06T 7/215 348/47 |
| 2014/0320403 A1 | 10/2014 | Lee | |
| 2014/0368712 A1* | 12/2014 | Park | H04N 25/745 348/308 |
| 2018/0009082 A1 | 4/2018 | Farrell | |
| 2018/0098082 A1* | 4/2018 | Burns | H04N 19/117 |
| 2018/0146149 A1 | 5/2018 | Suh | |
| 2018/0173956 A1 | 6/2018 | Edpalm | |
| 2018/0262705 A1 | 9/2018 | Park | |
| 2018/0308253 A1* | 10/2018 | Ryu | G06T 7/38 |
| 2019/0065885 A1* | 2/2019 | Li | G06T 7/248 |
| 2019/0089906 A1 | 3/2019 | Joo | |
| 2019/0191122 A1* | 6/2019 | Park | H04N 25/745 |
| 2020/0012893 A1 | 1/2020 | Shiraishi | |

FOREIGN PATENT DOCUMENTS

| | | |
|---|---|---|
| JP | 2000115749 A | 4/2000 |
| JP | 2018085725 A | 12/2014 |
| JP | 2014535098 A | 5/2018 |
| KR | 20080041056 A | 5/2008 |
| KR | 20140146337 A | 12/2014 |
| KR | 20180102986 A | 9/2018 |
| WO | 2011013281 A1 | 2/2011 |
| WO | 2018186398 A | 10/2018 |

OTHER PUBLICATIONS

J. Li, S. Dong, Z. Yu, Y. Tian and T. Huang, "Event-Based Vision Enhanced: A Joint Detection Framework in Autonomous Driving," 2019 IEEE International Conference on Multimedia and Expo (ICME), Shanghai, China, 2019, pp. 1396-1401, doi: 10.1109/ICME.2019.00242. (Year: 2019).*

Extended European Search Report for corresponding EP Application No. 19942456.5, 9 pages dated Jul. 11, 2022.

Office Action for corresponding CN Application No. 201980099177.2, 15 pages dated Oct. 18, 2023.

Notice of Preliminary Rejection for corresponding KR Application No. 10-2022-7005026, 11 pages, dated Nov. 15, 2023.

Communication pursuant to Article 94(3) EPC for corresponding EP Application No. 19942456.5, 8 pages dated Jan. 31, 2024.

Hongjie Liu, et al., "Combined Frame- and event based detection and tracking," IEEE International Symposium on Circuits and Systems, pp. 2511-2514, May 22, 2016 (For relevancy see Non-Pat. Lit. #1).

International Search Report for corresponding PCT Application No. PCT/JP2019/032343, 4 pages, dated Nov. 5, 2019.

The Second Office Action for corresponding CN Application No. 201980099177.2, 26 pages dated Jun. 24, 2024.

* cited by examiner

VISION SENSOR IMAGE PROCESSING DEVICE, IMAGE PROCESSING METHOD, AND PROGRAM

TECHNICAL FIELD

The present invention relates to an image processing device, an image processing method, and a program.

BACKGROUND ART

There has been known an event driven vision sensor in which a pixel detects a change in intensity of light to be incident to generate a signal asynchronously in time. Such an event driven vision sensor is advantageous in that the event driven vision sensor is able to operate at low power and high speed, compared to a frame-based vision sensor that scans all pixels for predetermined cycles, specifically, an image sensor such as a CCD (Charge Coupled Device) or a CMOS (Complementary Metal Oxide Semiconductor). A technique relating to such an event driven vision sensor is recited in PTL 1 and PTL 2, for example.

[CITATION LIST] [PATENT LITERATURE]

[PTL 1] JP 2014-535098 T [PTL 2] JP 2018-085725 A

[SUMMARY] [TECHNICAL PROBLEM]

However, regarding the event driven vision sensor, although such advantages described above have been known, it is hard to say that a method of using the event driven vision sensor in combination with another device, for example, a frame-based vision sensor, has been sufficiently proposed.

In view of this, an object of the present invention is to provide an image processing device, an image processing method, and a program capable of obtaining advantageous effects by use of an event driven vision sensor in combination with a frame-based vision sensor.

Solution to Problem

According to an aspect of the present invention, there is provided an image processing device including a region identifying section that identifies a first region in which a first motion occurs in a subject in an image captured by synchronous scanning, and a second region in which a second motion different from the first motion occurs in the subject or in which the subject is not substantially moving, on the basis of an event signal generated in response to a change in intensity of light in one or a plurality of pixels of the image, and an image processing section that executes image processing different between the first region and the second region on the first region and the second region, in the image.

According to another aspect of the present invention, there is provided an image processing method including a step of identifying a first region in which a first motion occurs in a subject in an image captured by synchronous scanning, and a second region in which a second motion different from the first motion occurs in the subject or in which the subject is not substantially moving, on the basis of an event signal generated in response to a change in intensity of light in one or a plurality of pixels of the image, and a step of executing image processing different between the first region and the second region on the first region and the second region, in the image.

According to a further aspect of the present invention, there is provided a program causing a computer to realize a function of identifying a first region in which a first motion occurs in a subject in an image captured by synchronous scanning, and a second region in which a second motion different from the first motion occurs in the subject or in which the subject is not substantially moving, on the basis of an event signal generated in response to a change in intensity of light in one or a plurality of pixels of the image, and a function of executing image processing different between the first region and the second region on the first region and the second region, in the image.

DESCRIPTION OF EMBODIMENTS

Hereinafter, some preferred embodiments of the present invention will be described in detail with reference to the attached drawings. Note that, in the present specification and the drawings, the same reference signs are provided to constituent elements with substantially the same functional configurations, and the description will not be repeated.

Figure 1:
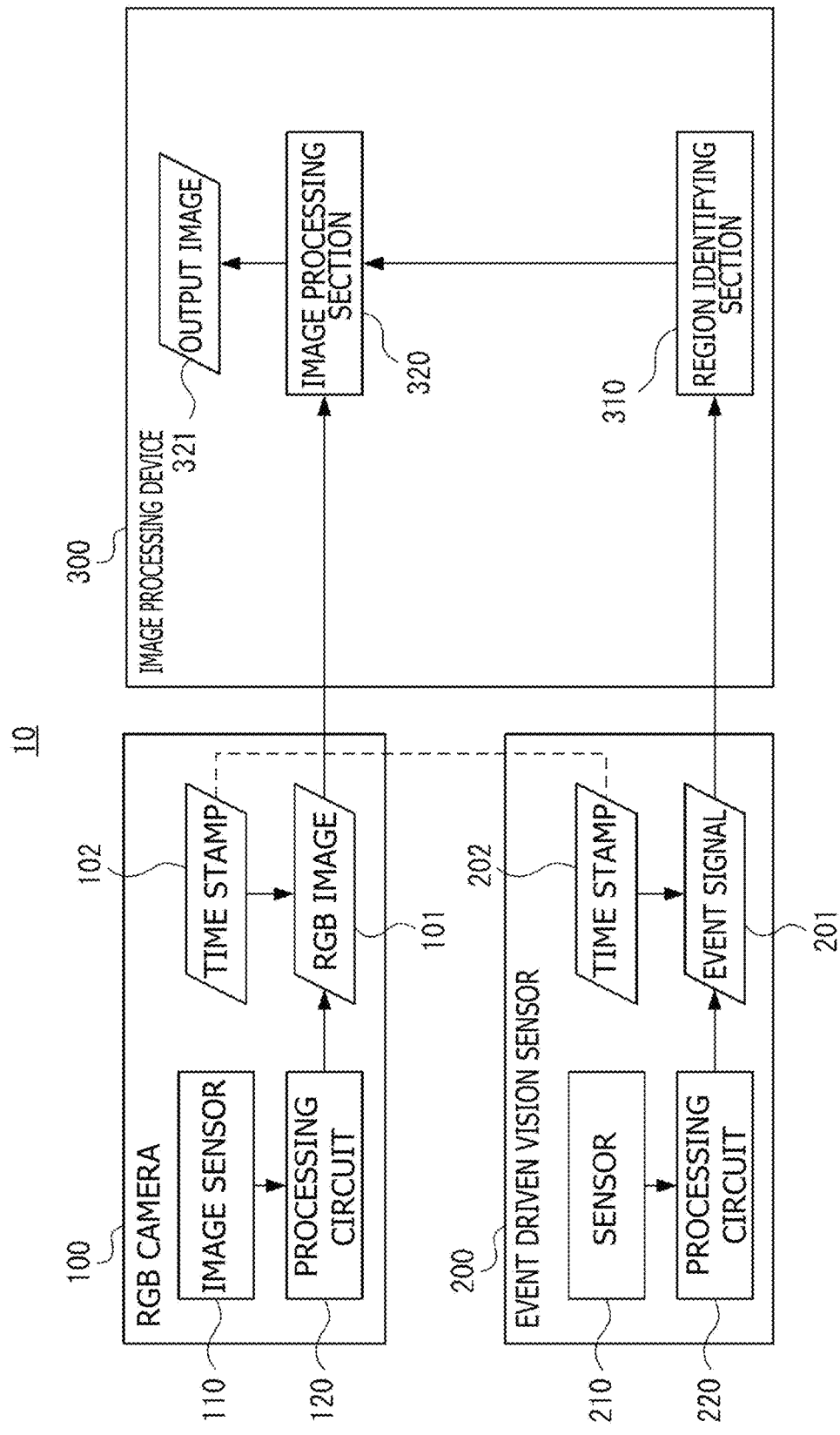
FIG. 1 is a block diagram illustrating a schematic configuration of a system according to an embodiment of the present invention.

FIG. 1 is a block diagram illustrating a schematic configuration of a system according to an embodiment of the present invention. A system 10 includes an RGB (Red-Green-Blue) camera 100, an EDS (Event Driven Sensor) 200, and an image processing device 300, as illustrated in FIG. 1.

The RGB camera 100 is an example of a first vision sensor that captures an image by synchronously scanning, and includes an image sensor 110, and a processing circuit 120 connected to the image sensor 110. The image sensor 110 captures the RGB image 101 by synchronously scanning all pixels at predetermined cycles or at a predetermined timing depending on a user operation, for example. In the present embodiment, the RGB image 101 includes a plurality of frame images captured sequentially at a predetermined frame rate, the plurality of frame images constituting a moving image. The processing circuit 120 converts the RGB image 101 to a format suitable to be stored and transmitted, for example. In addition, the processing circuit 120 provides a time stamp 102 to the RGB image 101.

The EDS 200 is an example of a second vision sensor that generates an event signal when a sensor detects a change in intensity of light, and includes sensors 210 constituting a sensor array, and a processing circuit 220 connected to the sensors 210. The sensors 210 each includes a light receiving element and generates an event signal 201 when detecting a change in intensity of light to be incident, more specifically, a change in luminance. Since the sensor 210 which does not detect a change in intensity of light to be incident does not generate the event signal 201, the event signal 201 is generated asynchronously in time in the EDS 200. The event signal 201 output through the processing circuit 220 includes identification information regarding each sensor 210 (for example, a position of a pixel), a polarity of a luminance change (higher or lower), a time stamp 202.

Here, in the present embodiment, the time stamp 102 provided to the RGB image 101 and the time stamp 202 provided to the event signal 201 are synchronized with each other. More Specifically, for example, by providing time information used for generating the time stamp 202 in the EDS 200 to the RGB camera 100, it is possible to synchronize the time stamp 102 with the time stamp 202. Alternatively, in a case in which time information for generating the time stamps 102 and 202 are independent of each other in the RGB camera 100 and the EDS 200, respectively, with a time at which a particular event (for example, a change of a subject all over the image) has occurred set as a reference, an offset amount of the time stamp is calculated, so that the time stamp 102 and the time stamp 202 can be synchronized with each other thereafter.

Figure 2:
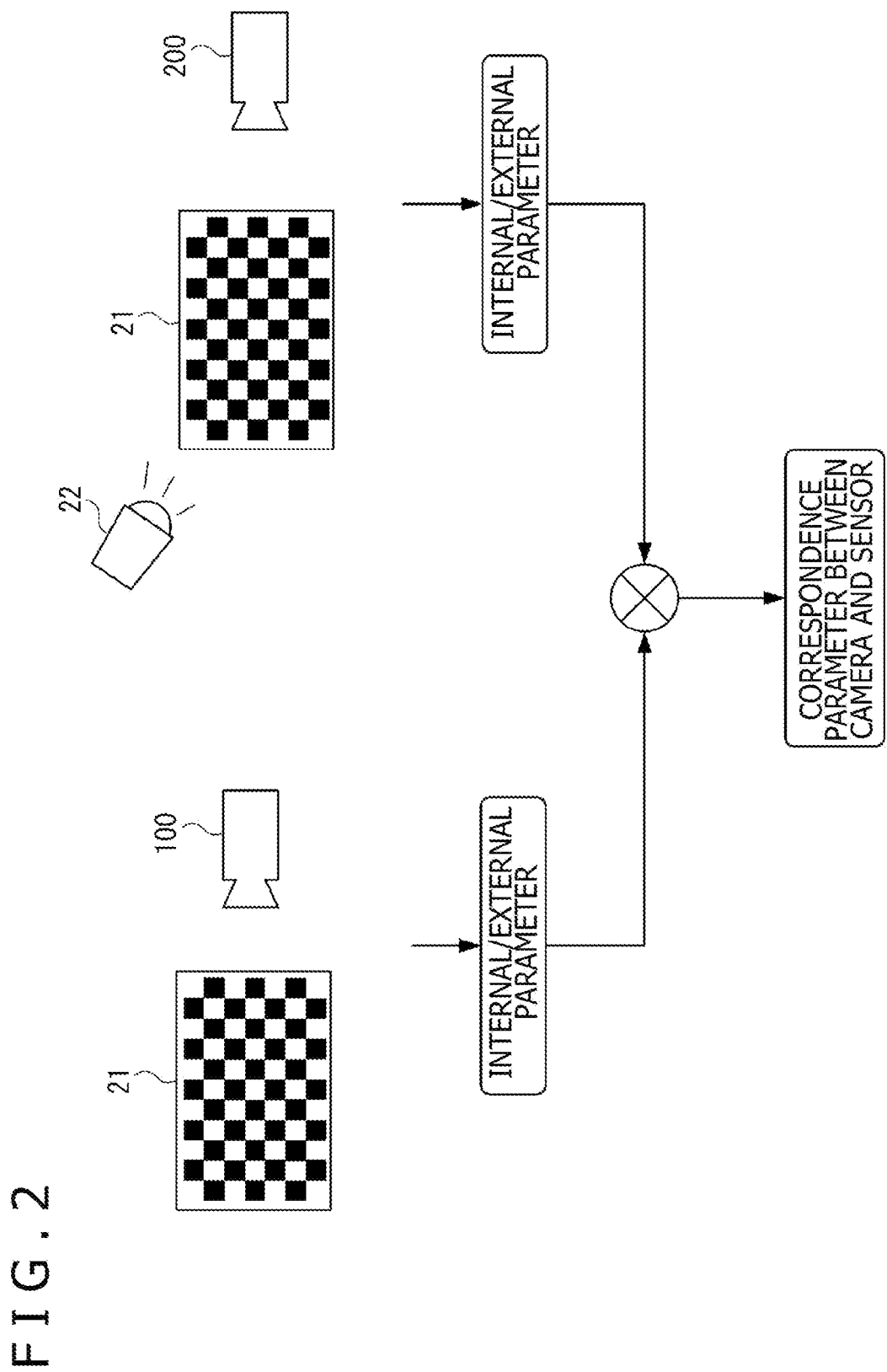
FIG. 2 is a diagram for schematically explaining calibration between a camera and a sensor according to the embodiment of the present invention.

Moreover, in the present embodiment, through a calibration procedure of the RGB camera 100 and the EDS 200 that is executed in advance, the sensors 210 of the EDS 200 are made to correspond to one or a plurality of pixels of the RGB image 101, and the event signal 201 is generated in response to a change in intensity of light in the one or the plurality of pixels. More specifically, as illustrated in FIG. 2, for example, the RGB camera 100 and the EDS 200 capture a calibration pattern 21 common to each other (in a case of the EDS 200, it is possible to capture a calibration pattern by flickering the entire region of the calibration pattern 21 by use of a light source 22, for example), and correspondence parameters between the camera and the sensor are calculated by respective internal parameters and external parameters of the RGB camera 100 and the EDS 200, so that the sensors 210 can be made to correspond to the one or the plurality of pixels of the RGB image 101.

Figure 3:
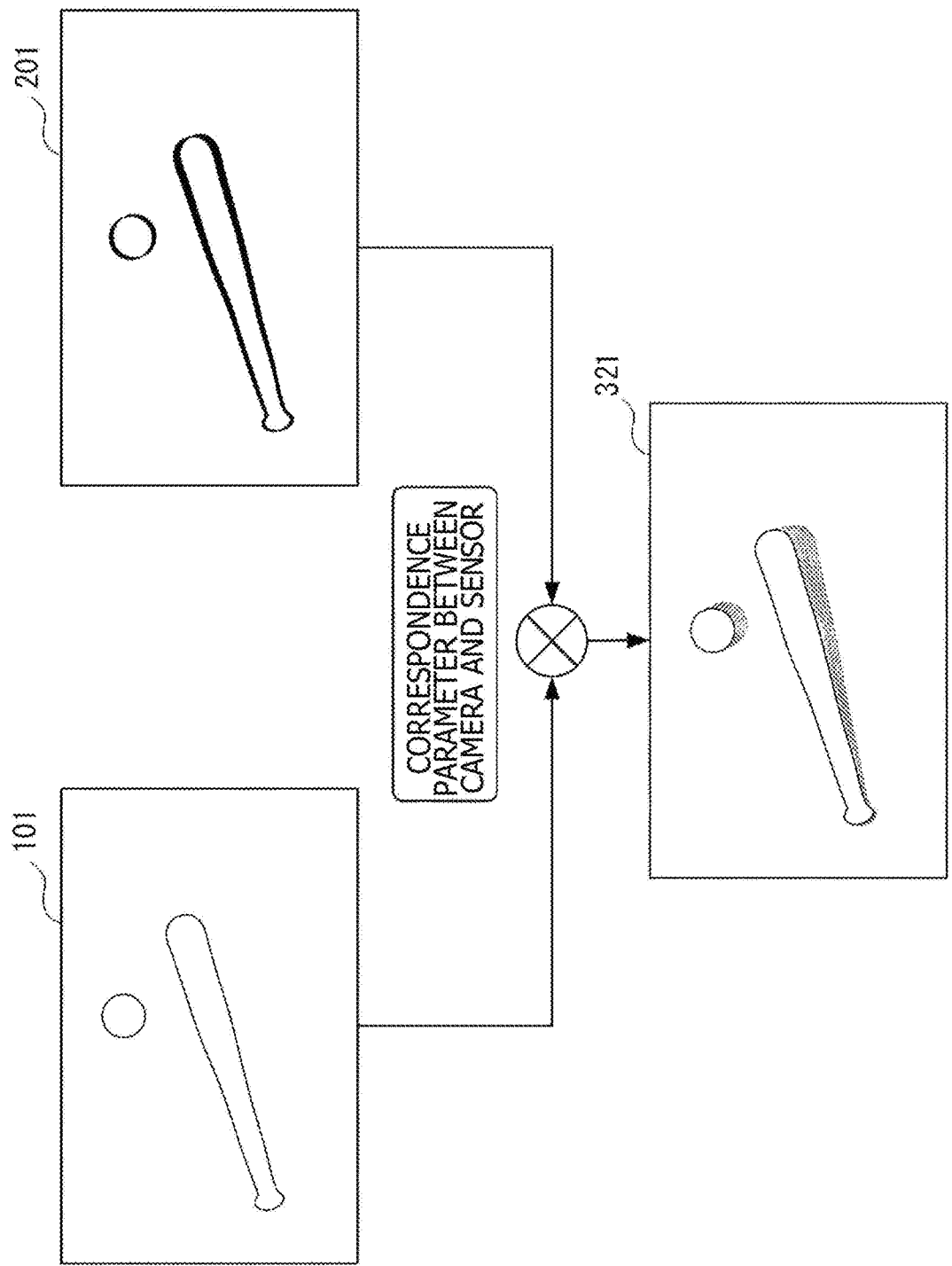
FIG. 3 is a diagram for explaining matching between an image and an event signal according to the embodiment of the present invention.

FIG. 3 is a diagram for explaining an example of matching between the image and the event signal according to the embodiment of the present invention. In the example illustrated in the diagram, there are presented the RGB image 101 captured by the RGB camera 100 and an image in which the event signal 201 output from the EDS 200 at a time at which to correspond to scanning of the RGB image 101 is arranged at a position of the corresponding pixel. The correspondence parameters between the camera and the sensor as described above with reference to FIG. 2 are calculated in advance, and accordingly, a coordinate system of the event signal 201 is converted to a coordinate system of the RGB image 101 as illustrated in FIG. 3, making it possible to overlay the event signal 201 on the RGB image 101.

With reference to FIG. 1 again, the image processing device 300 is implemented by a computer including a communication interface, a processor, and a memory, for example, and includes functions of a region identifying section 310 and an image processing section 320 which are achieved by the processor being operated according to a program stored in the memory or received through the communication interface. The functions of the individual sections will be described in more detail below.

The region identifying section 310 identifies, in the RGB image 101, a first region in which a first motion occurs in the subject and a second region in which a second motion different from the first motion occurs in the subject or the subject is not substantially moving, on the basis of the event signal 201. In a case in which a motion occurs in the subject in the RGB image 101, for example, a change in intensity of light, specifically, a luminance change that occurs at an edge portion of the subject is detected by the event signal 201, so that it is possible to identify a region in which a motion of the subject has occurred on the basis of the event signal 201, even if the whole subject is not recognized in the RGB image 101. Moreover, the region identifying section 310 can also identify a motion direction of the subject in each region from positional changes in luminance change in time series indicated by the event signal 201, for example. As described above, since the RGB image 101 includes a plurality of frame images constituting a moving image in the present embodiment, the region identifying section 310 may identify the first region and the second region in each of the plurality of frame images.

The image processing section 320 executes different image processing on each of the first region and the second region in the RGB image 101, to obtain an output image 321. At this time, the image processing section 320 can associate the first region and the second region which are identified by the region identifying section 310 with the RGB image 101, on the basis of the time stamp 102 of the RGB image 101 and the time stamp 202 of the event signal 201. Although the contents of the image processing executed by the image processing section 320 are not particularly limited, for example, the image processing section 320 may mark only the first region in the RGB image 101 or mark the first region and the second region in each of which a different motion occurs in the subject in the RGB image 101, in different modes from each other. Alternatively, the image processing section 320 may mask the second region (a background region, for example) in which the subject is not substantially moving in the RGB image 101. Alternatively, in a case in which the second region in which the subject is not substantially moving is identified, the image processing section 320 overwrites the first region with use of the second region identified by the preceding and succeeding frame images, in each of the plurality of frame images included in the RGB image 101, thereby hiding the moving subject in the first region. The execution of image processing different between the first region and the second region on the first region and the second region by the image processing section 320 includes executing image processing for any one of the first region or the second region and outputting the other region as it is.

Figure 4:
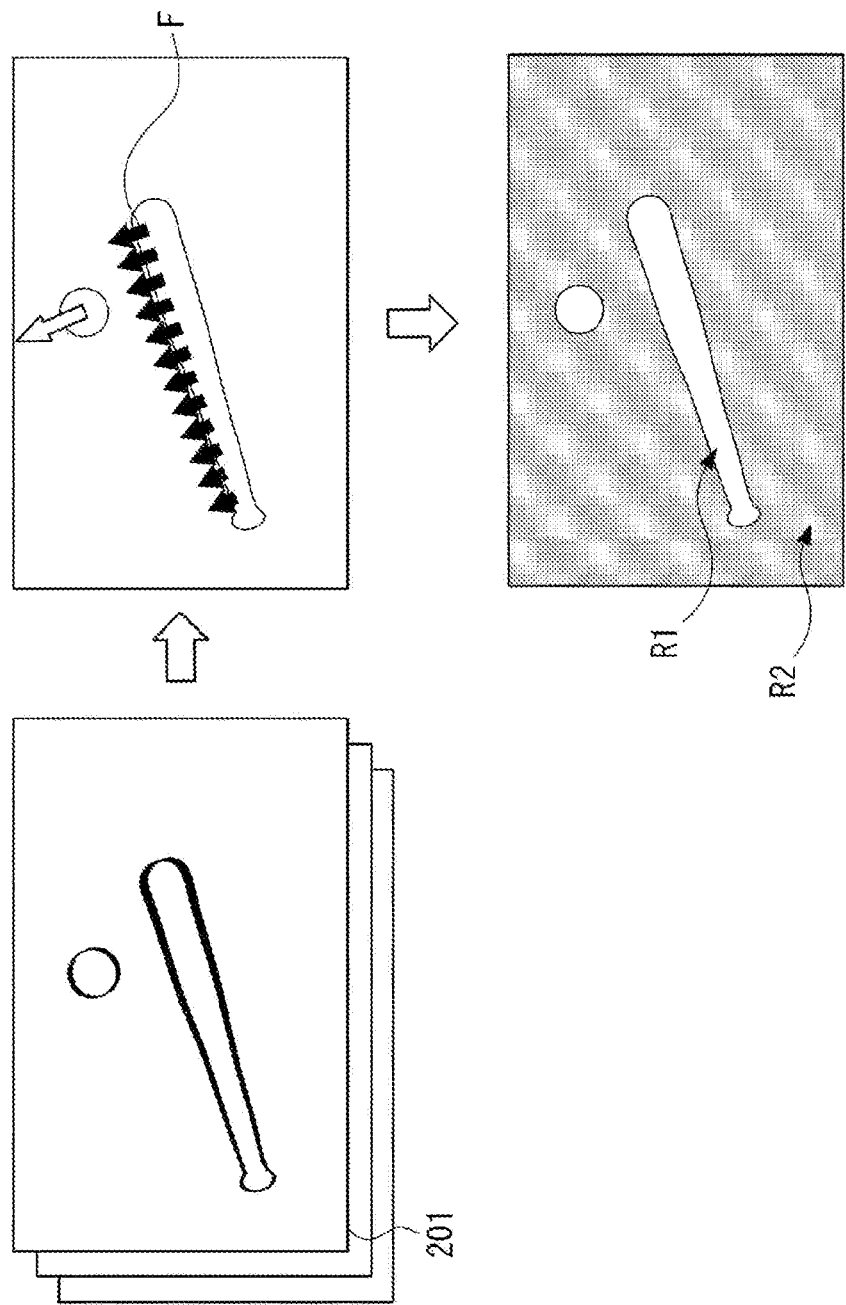
FIG. 4 is a diagram for explaining an example of region identification and image processing according to the embodiment of the present invention.
Figure 5:
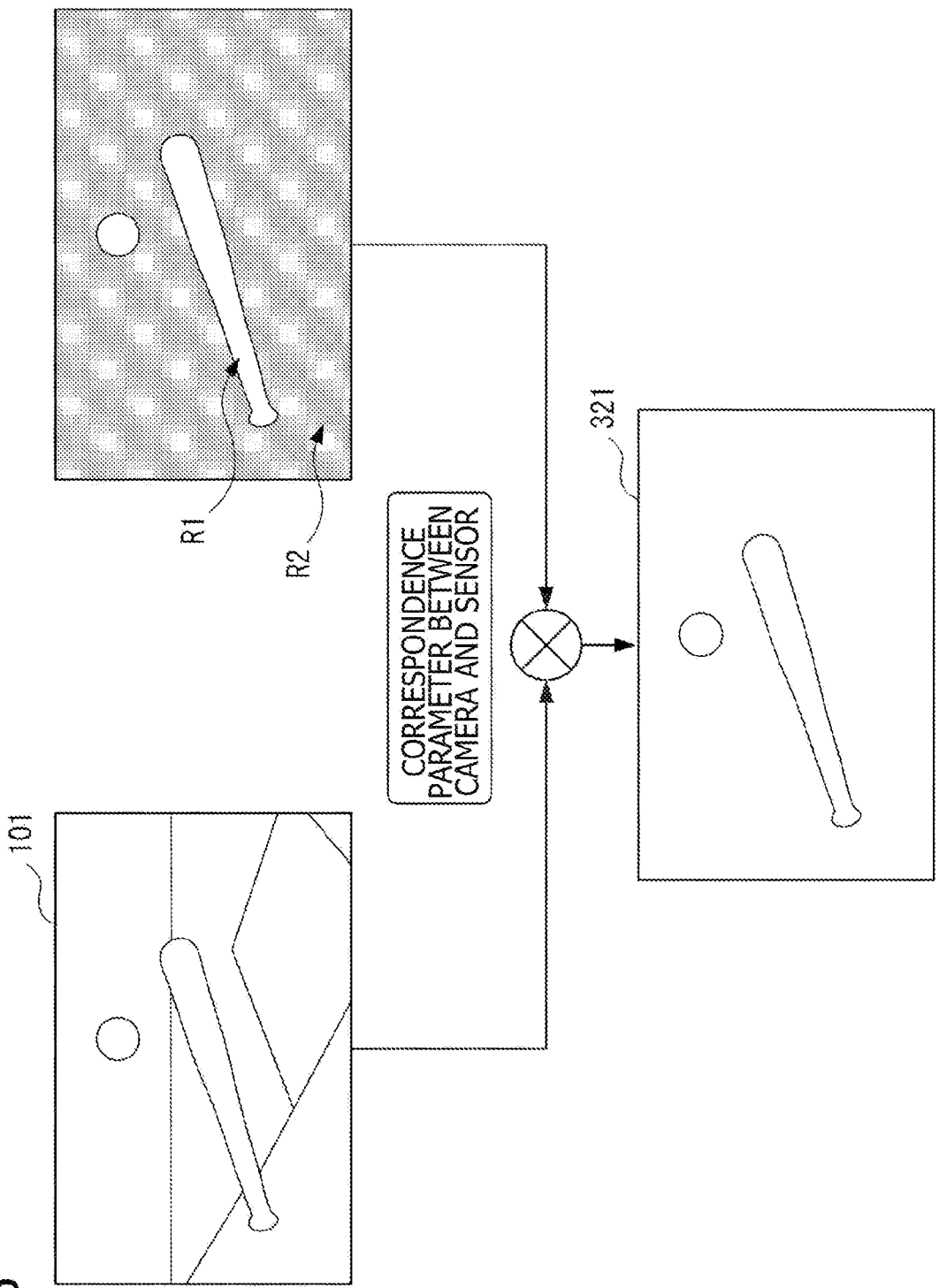
FIG. 5 is a diagram for explaining an example of region identification and image processing according to the embodiment of the present invention.

FIG. 4 and FIG. 5 are diagrams for explaining examples of region identification and image processing according to the embodiment of the present invention. In an example illustrated in FIG. 4, the region identifying section 310 identifies a region R1 in which a motion of the subject occurs and a region R2 in which the subject is not substantially moving, from the event signal 201 in time series. For example, the region identifying section 310 extracts the region R1 identified by the event signal 201 in time series and having a magnitude of an optical flow F equal to or larger than a predetermined threshold and sets a remaining region as the region R2.

In another example, the region identifying section 310 may demarcate the extracted region R1 according to a direction and a magnitude of the motion indicated by the optical flow F so as to identify a plurality of regions in each of which a different motion of the subject occurs. The optical flow F is an example of information indicating a motion direction of the subject. By identifying the motion direction of the subject, it is possible to continuously track (perform tracking) the subject corresponding to the region R1, for example, in the plurality of frame images included in the RGB image 101.

Meanwhile, as an example illustrated in FIG. 5, the image processing section 320 can overlay, on the RGB image 101, the regions R1 and R2 identified by the region identifying section 310 through the matching procedure between the image as has been explained with reference to FIG. 3 and event signal. In the illustrated example, the image processing section 320 masks the region R2 (background region) in which the subject is not substantially moving in the RGB image 101, and accordingly, the output image 321 in which the region R1 in which the motion of the subject occurs is cut out is obtained.

In another example, instead of masking the region R2, or along with masking of the region R2, the image processing section 320 may mark the region R1. In a case in which a plurality of regions in each of which a different motion occurs in the subject are identified, the image processing section 320 may mark the plurality of regions in different modes from one another. For example, in a case in which the motion direction of the subject in each region is identified by the optical flow F in the above-described example and the subject corresponding to each region is continuously tracked in the plurality of frame images included in the RGB image 101, the image processing section 320 can continuously execute the masking process on the region as described above or the marking process on the region described above in the plurality of frame images.

In the embodiment of the present invention as described above, the region identifying section 310 of the image processing device 300 identifies the region in which a motion occurs in the subject in the RGB image 101 on the basis of the event signal 201. The event signal 201 is generated only in a case in which a change in intensity of light is detected in one or a plurality of pixels in the RGB image 101, and accordingly, for example, compared to a case in which pixels in each of in the plurality of RGB images 101 that are temporally continuous are compared to identify a region in which a motion occurs in the subject, the processing speed can be more increased. In addition, in general, since a cycle in which the EDS 200 can generate the event signal 201 is greatly shorter than a frame rate in a case in which the RGB camera 100 captures a moving image, as in the present embodiment, by use of the event signal 201, it is possible to cause the image processing to follow the motion of the subject with higher accuracy than a case in which the motion of the subject is identified only by use of the RGB image 101 in the moving image, for example.

Figure 6:
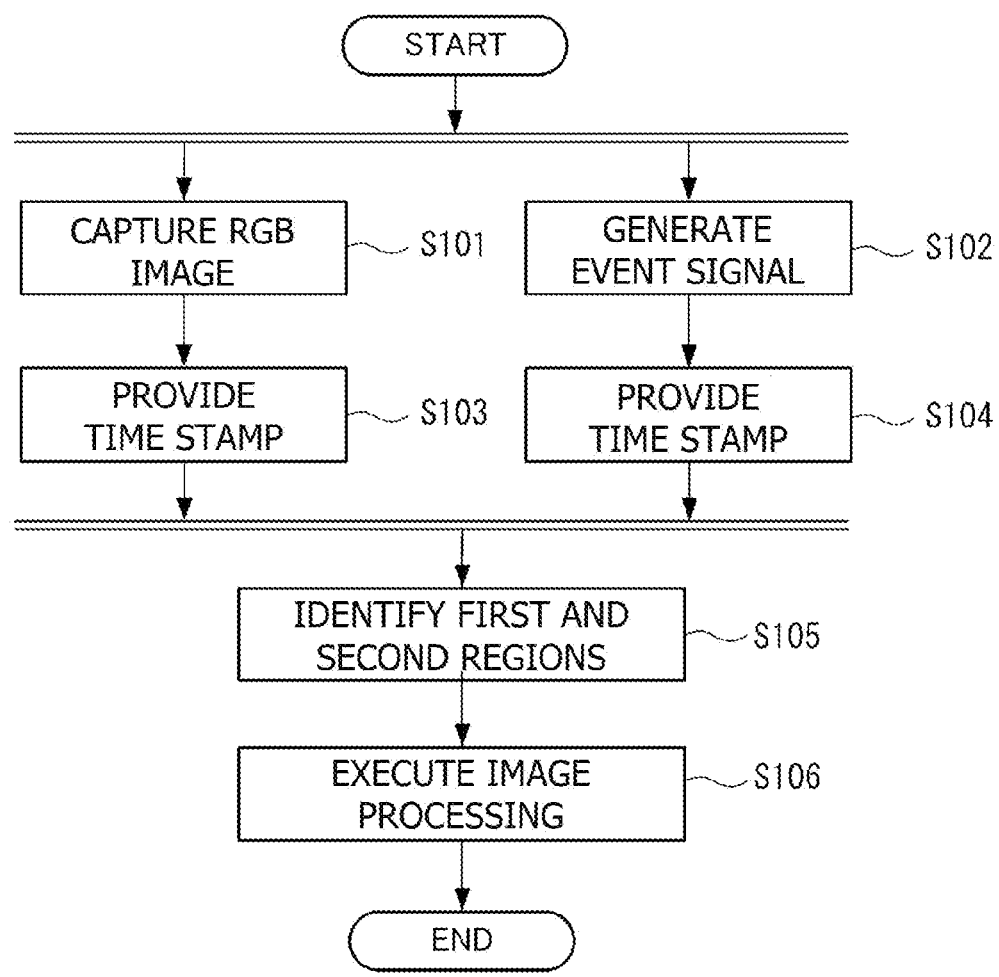
FIG. 6 is a flow chart indicating an example of an image processing method according to the embodiment of the present invention.

FIG. 6 is a flow chart indicating an example of an image processing method according to the embodiment of the present invention. In the example illustrated in the diagram, the RGB camera 100 captures the RGB image 101 (step S101), and at the same time, the EDS 200 generates the event signal 201 (step S102). Note that the step S102 of generating the event signal 201 is executed only in a case in which the sensor 210 corresponding to one or a plurality of pixels of the RGB image 101 detects a change in intensity of light. The RGB image 101 is provided with the time stamp 102 (step S103), and the event signal is provided with the time stamp 202 (step S104).

Next, the process in the image processing device 300 is executed. First, the region identifying section 310 identifies the first and second regions in the RGB image 101 as described above on the basis of the event signal 201 (step S105). Then, the image processing section 320 executes different image processing for the first and second regions identified in the RGB image 101 (step S106). At this time, the RGB image 101 on which the image processing is to be executed, and the first and second regions identified on the basis of the event signal 201 are associated with each other by use of the time stamps 102 and 202. According to the process described above, for example, it is possible to obtain the output image 321 in which the moving subject is cut out and the background is masked and the output image 321 that is a moving image in which the subject with different motions is tracked by marking in different modes.

While some embodiments of the present invention have been described above in detail with reference to the attached drawings, the present invention is not limited to the examples. It is apparent that those with normal knowledge in the technical field of the present disclosure can make various changes or modifications within the scope of the technical idea described in the claims, and it is understood that the changes and the modifications obviously belong to the technical scope of the present invention.

REFERENCE SIGNS LIST

10: System
100: RGB camera
101: RGB image
102: Time stamp
110: Image sensor
120: Processing circuit
201: Event signal
202: Time stamp
210: Sensor
220: Processing circuit
300: Image processing device
310: Region identifying section
320: Image processing section
321: Output image

The invention claimed is:

1. An image processing device comprising:
a processor configured to:
receive, from a first vision sensor, respective frames of an image captured by the first vision sensor by synchronously scanning all pixels of a pixel array in accordance with a synchronous frame rate, wherein the respective frames of the image constitute a moving image;
identify, in each respective frame of the image captured by the first vision sensor, a first region in which a first motion occurs in which a subject substantially moves in the image captured by the first vision sensor;
receive, from a second vision sensor, event signals generated by the second vision sensor on an asynchronous basis for only respective pixels of a pixel array in which a respective intensity of light has exceeded a predetermined threshold;
identify a second region in which a second motion occurs in which the subject is not substantially moving, on a basis of event signals occurring at an edge portion of the subject detected; and
execute first image processing and second image processing on the image captured by the first vision sensor to thereby generate a plurality of output frame images, the second image processing being different from the first image processing, wherein executing the first image processing and the second image processing on the image comprises generating an output frame image of the plurality of output frame images in which a moving subject is cut out.

2. The image processing device according to claim 1, wherein the processor is further configured to:
identify a motion direction of the subject at least in the first region, in each of the respective frame images, and
continuously execute the first image processing on the first region and the second image processing on the second region in the respective frame images, on a basis of the motion direction.

3. The image processing device according to claim 1, wherein the processor is further configured to mark at least the first region in the image.

4. The image processing device according to claim 3, wherein the processor is further configured to:
identify the second region in which the second motion occurs in the subject, and
mark the first region and the second region in the image in different modes.

5. The image processing device according to claim 1, wherein the processor is further configured to mask the second region for each output frame image of the plurality of output frame images that do not include the subject.

6. The image processing device according to claim 1, wherein the processor is further configured to:
overwrite the first region with use of the second region identified by the preceding and succeeding frame images, in each of the respective frame images.

7. An image processing method comprising:
receiving, from a first vision sensor, respective frames of an image captured by the first vision sensor by synchronously scanning all pixels of a pixel array in accordance with a synchronous frame rate, wherein the respective frames of the image constitute a moving image;
identifying, in each respective frame of the image captured by the first vision sensor, a first region in which a first motion occurs in which a subject substantially moves in an image captured by the first vision sensor;
receiving, from a second vision sensor, event signals generated by the second vision sensor on an asynchronous basis for only respective pixels of a pixel array in which a respective intensity of light has exceeded a predetermined threshold;
identifying a second region in which a second motion occurs in which the subject is not substantially moving, on a basis of event signals occurring at an edge portion of the subject detected; and
executing first image processing and second image processing on the image captured by the first vision sensor to thereby generate a plurality of output frame images the second image processing being different from the first image processing, wherein executing the first image processing and the second image processing on the image comprises generating an output frame image of the plurality of output frame images in which a moving subject is cut out.

8. A non-transitory, computer readable storage medium containing a program, which when executed by a computer, causes the computer to perform an image processing method by carrying out actions, comprising:
receiving, from a first vision sensor, respective frames of an image captured by the first vision sensor by synchronously scanning all pixels of a pixel array in accordance with a synchronous frame rate, wherein the respective frames of the image constitute a moving image;
identifying, in each respective frame of the image captured by the first vision sensor, a first region in which a first motion occurs in which a subject substantially moves in an image captured by the first vision sensor;
receiving, from a second vision sensor, event signals generated by the second vision sensor on an asynchronous basis for only respective pixels of a pixel array in which a respective intensity of light has exceeded a predetermined threshold;
identifying a second region in which a second motion occurs in which the subject is not substantially moving, on a basis of event signals occurring at an edge portion of the subject detected; and
executing first image processing and second image processing on the image captured by the first vision sensor to thereby generate a plurality of output frame images the second image processing being different from the first image processing, wherein executing the first image processing and the second image processing on the image comprises generating an output frame image of the plurality of output frame images in which a moving subject is cut out.

9. The image processing device of claim 1, wherein each frame image of the respective frame images is associated with a respective image timestamp thereby generating a set of image timestamps and wherein each event signal is associated with respective event timestamp thereby generating a set of event timestamps.

10. The image processing device of claim 9, wherein the set of image timestamps are synchronized with the set of event timestamps.

11. The image processing device of claim 9, wherein the processor is further configured to:
associate the first region and the second region with a respective frame of the respective frames based on the set of image timestamps and the set of event timestamps.

12. The image processing device of claim 1, wherein the respective frame images comprise a plurality of RGB images.

13. The image processing device of claim 1, wherein a time associated with generating a single event signal is less than the synchronous frame rate of the first vision sensor.

14. The image processing method of claim 7, further comprising:
calibrating, prior to synchronously scanning all pixels of the pixel array, the first vision sensor and the second vision sensor such that the event signals generated by the second vision sensor correspond to one or more pixels of the pixel array.

15. The image processing method of claim 14, wherein calibrating the first vision sensor and the second vision sensor comprises:
displaying a calibration pattern to the first vision sensor and the second vision sensor;
flickering the calibration pattern using a light source;
capturing, responsive to flickering the calibration pattern, a plurality of calibration images using the first vision sensor and a plurality of event signals using the second vision sensor; and adjusting one or more parameters of the first vision sensor and the second vision sensor such that the plurality of event signals correspond to the calibration images.

16. The image processing method of claim 7, wherein each frame image of the respective frame images is associated with a respective image timestamp thereby generating a set of image timestamps and wherein each event signal is associated with respective event timestamp thereby generating a set of event timestamps.

17. The image processing method of claim 16, wherein the set of image timestamps are synchronized with the set of event timestamps.

18. The image processing method of claim 7, wherein a time associated with generating a single event signal is less than the synchronous frame rate of the first vision sensor.

19. The image processing method of claim 7, further comprising:
   identifying a motion direction of the subject at least in the first region, in each of the respective frame images, and
   executing the first image processing on the first region and the second image processing on the second region in the respective frame images, on a basis of the motion direction.

20. The image processing method of claim 7, wherein the second image processing comprises masking the second region for each output frame image of the plurality of output frame images that do not include the subject.

* * * * *